United States Patent [19]

Leir

[11] 3,887,568

[45] June 3, 1975

[54] PROCESS FOR PIPERIDINE DERIVATIVES

[75] Inventor: Charles M. Leir, Woodbury, Minn.

[73] Assignee: Riker Laboratories, Inc., Northridge, Calif.

[22] Filed: July 12, 1973

[21] Appl. No.: 378,525

[52] U.S. Cl. ............... 260/293.8; 260/592; 424/267
[51] Int. Cl. ............................................. C07d 29/20
[58] Field of Search .................................... 260/293.8

[56] References Cited
UNITED STATES PATENTS

| | | | |
|---|---|---|---|
| 2,489,669 | 11/1949 | Plati et al. | 260/293.8 |
| 3,408,445 | 10/1968 | Levy et al. | 424/267 |
| 3,591,593 | 7/1971 | Thiele et al. | 260/293.8 |

OTHER PUBLICATIONS

J.A.C.S. 79:950 (1957) Searles et al.

*Primary Examiner*—Henry R. Jiles
*Assistant Examiner*—S. D. Winters
*Attorney, Agent, or Firm*—Alexander, Sell, Steldt & DeLaHunt

[57] ABSTRACT

A process for preparing 1-alkyl-3-benzoyl-4-hydroxy-4-phenylpiperidine and certain derivatives by reaction of appropriately substituted benzenes with a 3-halopropionyl halide followed by reaction of the intermediates with an alkylamine is described.

4 Claims, No Drawings

PROCESS FOR PIPERIDINE DERIVATIVES

BACKGROUND OF THE INVENTION

Although the compounds prepared by the present invention have been known for many years, the original method of synthesis has not been improved. Plati and Wenner (U.S. Pat. No. 2,489,669 issued Nov. 29, 1949) report the only previously known synthetic methods for the preparation of the compounds of the present invention. Later patents, for example U.S. Pat. No. 3,408,445 issued Oct. 29, 1968, use the reaction scheme of the prior art and disclose the utility of the compounds as antiinflammatory agents.

This invention describes a new, improved synthetic process for the synthesis of a limited class of 1-alkyl-3-benzoyl-4-hydroxy-4-phenylpiperidines. This class comprises those compounds which are unsubstituted on the phenyl rings and those compounds substituted by halogen in the 4 position (para) of the phenyl rings. The process of the present invention reduces the number of steps necessary in the reaction sequence, provides increased overall yields and eliminates an undesirable exothermic step.

The process of the invention comprises two distinct steps. In step (A) benzene or a monohalobenzene is reacted with a 3-halopropionyl halide, in the presence of a Lewis acid catalyst. Generally a solvent is used. In step (B) the product of step (A), a 3-halopropionylbenzene (or 3-halopropionyl-4-halobenzene) is reacted with an aqueous alkylamine. The product may be isolated as the free base, or converted to a pharmaceutically acceptable salt. Step (B) is particularly surprising and novel, since two relatively simple reactants form a complex heterocyclic structure in very high yield.

DETAILED DESCRIPTION OF THE INVENTION

This invention relates to a new method for the preparation of 1-alkyl-3-benzoyl-4-hydroxy-4-phenylpiperidines. More specifically it relates to a novel and improved process for the preparation of the compounds of the formula

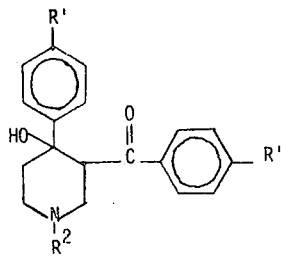

wherein R' is hydrogen or halogen, preferably fluorine or chlorine, and $R^2$ is lower alkyl, and their pharmaceutically acceptable salts. This process comprises steps (A) and (B) as shown below:

(A)
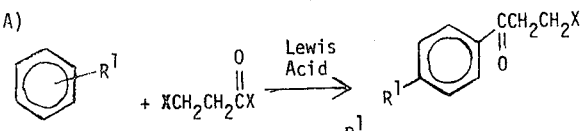

(B)
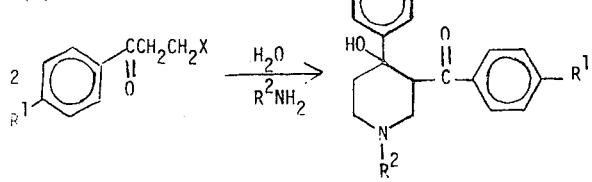

wherein X is halogen, preferably chlorine or bromine and most preferably chlorine.

In step (A) benzene or chlorobenzene or fluorobenzene is reacted with a 3-halopropionyl halide in the presence of a Lewis acid catalyst. Fluorobenzene is currently preferred because the final product compound is of interest as a possible pharmaceutical, i.e., an antiinflammatory agent. When choosing a 3-halopropionyl halide the chloride is preferred, since it reacts readily and is much less expensive than the bromide, fluoride, or iodide. The halo group is preferably bromo or chloro and most preferably chloro. Chloro offers good reactivity with low cost compared to the other halogens. The Lewis acid catalyst must be a strong Lewis acid, such as aluminum chloride, aluminum bromide, ferric chloride, boron trichloride, trifluoromethanesulfonic acid and the like. Aluminum chloride ($AlCl_3$) is presently preferred. An equimolar amount of the Lewis acid is generally used.

The use of an inert solvent is preferred, and chlorinated hydrocarbons, are the presently preferred solvents, for example dichloroethane, dichloromethane, trichloroethylene, and the like. The reaction is exothermic and is controlled by adding the acid chloride to the halobenzene or benzene-Lewis acid-solvent mixture in a stepwise fashion with vigorous stirring, and external cooling. Temperatures in the range of 100°C may be used but a reaction temperature of 10° to 30°C is preferred. The time of the reaction depends upon the reaction scale, the temperature, the solvent and other factors, as will be appreciated by those skilled in the art. The reaction is substantially complete once it has ceased to be exothermic, although it is generally stirred for one or more hours to insure completion of the reaction.

The product is isolated by conventional methods. For example, the reaction mixture is poured into excess ice and water, the organic layer is separated and the water layer is extracted with the reaction solvent or a chlorinated hydrocarbon. The organic extracts are combined with the separated organic layer. The combined organic layers contain the product. The organic layer is dried using an inorganic salt drying agent such as sodium sulfate, magnesium sulfate and the like. The product, generally an oil, can be used as is for the next step, but it is preferably triturated with hydrocarbon solvent to provide a white solid beta-halopropiophenone product useful, without further purification for the next step. Yields are generally 60 to 90%, usually greater than 70%.

Step (B), the condensation step, is carried out by adding the alkylamine to a well-stirred aqueous suspension of the beta-halopropiophenone product of step (A). The alkylamine is preferably added in excess, and most preferred is a 2 to 10 fold excess. The reaction is mildly exothermic and is controlled by adding the alkylamine dropwise with vigorous stirring and by external cooling. The temperature is generally maintained below 75°C during the addition, although higher temperatures can be used, and most preferably below 25°C but above 0°C. The mixture is then stirred at about 20° to 30°C. (ambient temperature) for several hours up to one day or more to allow the reaction to come to completion. Vigorous stirring is advantageous. The product, a 1-alkyl-3-benzoyl-4-hydroxy-4-phenylpiperidine, is a white solid which precipitates during the reaction. It is isolated by conventional methods such as decantation, filtration, or centrifugation.

The product piperidine is obtained in greater than 80% yield, generally 90 to 100% yield, and may be recrystallized or otherwise purified, or converted into a pharmaceutically acceptable salt. Suitable salts are, e.g., those described in U.S. Pat. No. 3,408,445.

EXAMPLE 1

3-Chloro-4'-fluoropropiophenone

Fluorobenzene (645.3 g, 6.72 mole), dichloroethane (336 ml) and aluminum chloride (983 g, 7.39 mole) are stirred vigorously and the reaction temperature is maintained below 20°C while adding 3-chloropropionyl chloride (726 g, 6.72 mole) over 75 minutes. To this heavy mixture is added 400 ml of dichloroethane and stirring is continued for three hours. During this time the temperature is maintained between 15° and 20°C. by cooling.

The reaction mixture is then poured into an ice-water mixture. One liter of dichloromethane is added to the mixture. The organic layer is separated and the aqueous layer is re-extracted with dichloromethane (800 ml). The combined organic layers are then washed with 1 liter of water. The layers are separated and the organic layer is dried over anhydrous sodium sulfate. The solvent is removed by evaporation under vacuum and the residual oil contains the desired product. The oil is triturated with 3 liters of petroleum ether (30°–60°C fraction). After chilling and isolation by filtration 608 g of pure white crystalline product is obtained. The melting point of the product is 46°–49°C. The structure of the product is confirmed by analysis of its nuclear magnetic resonance and infrared spectra. The filtrate is concentrated by evaporation under vacuum to yield 500 g of oil which is diluted with 2 liters of pentane. From this solution is obtained 377 g of solid, melting point 49°C. The solid is recrystallized from 1,500 ml of hexane, treated with decolorizing charcoal, to provide 270 g of solid. The total yield of solid product is 878 g, which is 70%.

EXAMPLE 2

1-Methyl-3-(4'-fluorobenzoyl)-4-hydroxy-4-(4'-fluorophenyl)piperidine

3-Chloro-4'-fluoropropiophenone (37.4 g, 0.20 mole) and 200 ml of water are mixed together at about 15°C and stirred rapidly while adding 40% aqueous methylamine (62 ml) dropwise over a period of 20 minutes. The temperature is maintained at about 15°C during the addition. The reaction is allowed to warm slowly to about 25°C while stirring vigorously over a period of 16 hours. The resulting white solid is collected by filtration and washed with several 300 ml portions of water, then dried. The product is suitable for further use without additional purification.

EXAMPLE 3

1-Methyl-3-(4'-fluorobenzoyl)-4-hydroxy-4-(4'-fluorophenyl)piperidine Hydrochloride The white solid product from Example 2 is treated with a mixture of 280 ml of water and 30 ml of concentrated hydrochloric acid. The solid dissolves, but after a few minutes, crystals begin to form. The mixture is heated to 90°C to effect solution and filtered to remove traces of insoluble impurity. The solution is then cooled and the resulting white solid is collected, washed with isopropyl alcohol and diethyl ether then dried. The yield is 34 g, 92.5%. Careful analytical examination of this product shows that it is very pure.

Using the reactants described, the following products are prepared using Step A of the process of the invention:

Table I

| Example No. | Reactants | Catalyst | Product |
|---|---|---|---|
| 4 |  | AlCl₃ | 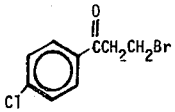 |
| 5 |  | AlCl₃ | 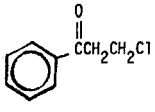 |
| 6 |  | AlCl₃ | 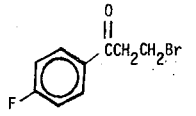 |
| 7 |  | FeCl₃ | 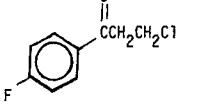 |

Using the reactants described, the following products are prepared using Step B of the process of the invention:

Table II

| Example No. | Reactants | Product |
|---|---|---|
| 8 | 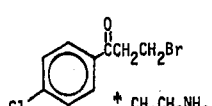 | 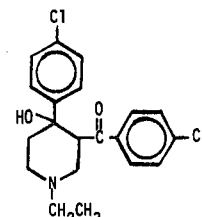 |
| 9 | 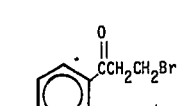 | 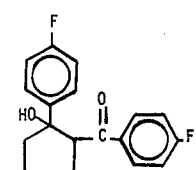 (m.p. 90-95°C.) |
| 10 | 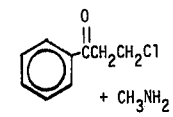 | 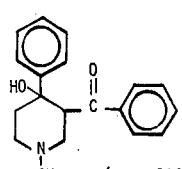 (m.p. 136°C.) |
| 11 | 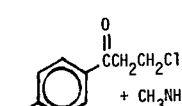 | 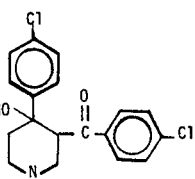 (m.p. 168-170°C.) |

What is claimed is:

1. A process for the preparation of compounds of the formula:

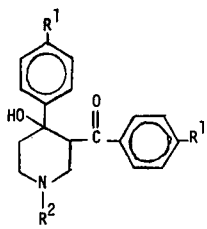

wherein $R^1$ is selected from fluorine, chlorine and hydrogen and $R^2$ is lower alkyl, and their pharmaceutically acceptable salts comprising 1. reacting benzene, chlorobenzene or fluorobenzene with a 3-halopropionyl halide in the presence of a Lewis acid and
2. treating the resulting product with excess aqueous lower alkylamine.

2. A process for the preparation of compounds of the formula

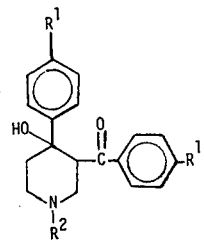

wherein $R^1$ is selected from fluorine, chlorine and hydrogen and $R^2$ is lower alkyl, and their pharmaceutically acceptable salts comprising the step of reacting a 3-chloropropiophenone containing the desired $R^1$ substituent with excess aqueous lower alkylamine at a temperature in the range of 0° to 75°C.

3. The process of claim 1 wherein $R^1$ is fluorine and $R^2$ is methyl and 3-chloropropionyl chloride is used.

4. The process of claim 2 wherein $R^1$ is fluorine and $R^2$ is methyl and 3-chloro-4'-fluoropropiophenone is used.

* * * * *